United States Patent [19]
Lombardi

[11] Patent Number: 5,884,379
[45] Date of Patent: Mar. 23, 1999

[54] DRUM PROCESSING APPARATUS

[75] Inventor: Donald G. Lombardi, Thousand Oaks, Calif.

[73] Assignee: Drum Workshop, Inc., Oxnard, Calif.

[21] Appl. No.: 827,870

[22] Filed: Apr. 11, 1997

[51] Int. Cl.[6] .................................................. B23B 7/00
[52] U.S. Cl. .................... 29/27 C; 29/27 R; 29/33 D; 29/33 T; 82/113; 82/128; 409/165; 409/166
[58] Field of Search ................. 29/33 D, 33 T, 29/27 C, 27 R; 409/163, 165, 166; 82/113, 128

[56] References Cited

U.S. PATENT DOCUMENTS

| | | | |
|---|---|---|---|
| 2,537,916 | 1/1951 | Rosenboom | 82/128 |
| 3,134,410 | 5/1964 | Kuykendall | 82/128 |
| 3,171,309 | 3/1965 | Cloutier | 82/128 |
| 3,222,960 | 12/1965 | Gill | 82/128 |
| 4,329,192 | 5/1982 | White, Jr. et al. | 409/165 |
| 4,353,154 | 10/1982 | Wagner | 29/27 A |
| 4,625,601 | 12/1986 | Brummet | 82/4 C |
| 4,700,439 | 10/1987 | Hines | 29/33 T |
| 4,744,123 | 5/1988 | Le Testu et al. | 15/104.4 |
| 4,777,713 | 10/1988 | Kitamura | 29/27 C |
| 4,827,994 | 5/1989 | Whitford | 82/113 |
| 5,605,083 | 2/1997 | Lupke et al. | 82/113 |
| 5,678,963 | 10/1997 | Heimann | 409/131 |
| 5,711,835 | 1/1998 | Dona et al. | 156/154 |

*Primary Examiner*—Daniel W. Howell
*Assistant Examiner*—Christopher Kirkman
*Attorney, Agent, or Firm*—William W. Haefliger

[57] ABSTRACT

An apparatus for processing the cylindrical shells of drums, which comprises a cradle sized for reception in embracing relation with the shell, the shell having a longitudinal axis, the cradle having support structure to clamp a cylindrical surface of the shell and at lengthwise locations, for supporting the shell; structure operatively coupled to the cradle to effect displacement of the support structure to clamp the shell surface; structure for rotating the cradle about an axis corresponding to the drum shell axis, thereby to rotate the shell about the axis; and tooling facing the shell to engage and process the shell as it rotates.

9 Claims, 5 Drawing Sheets

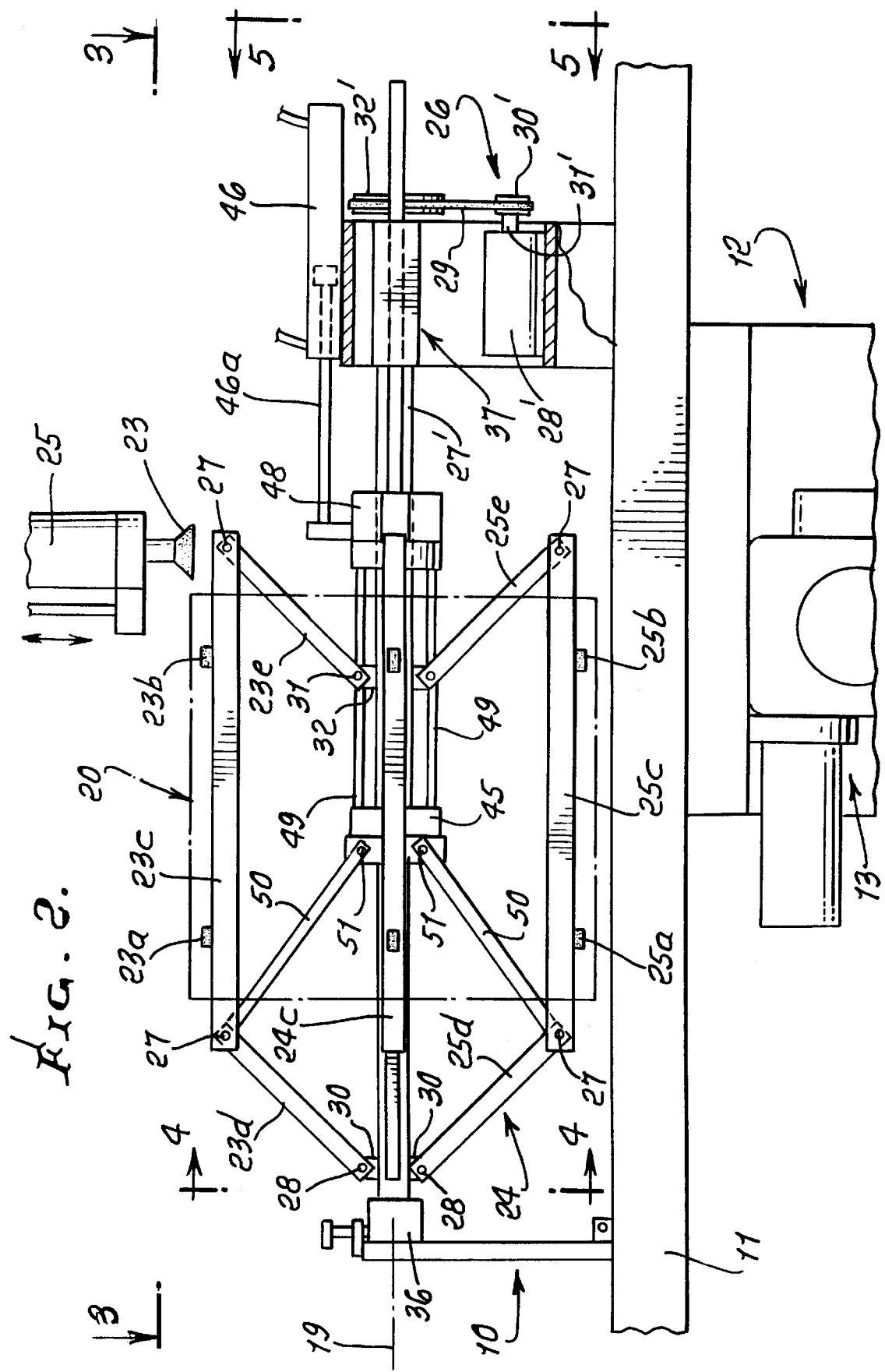

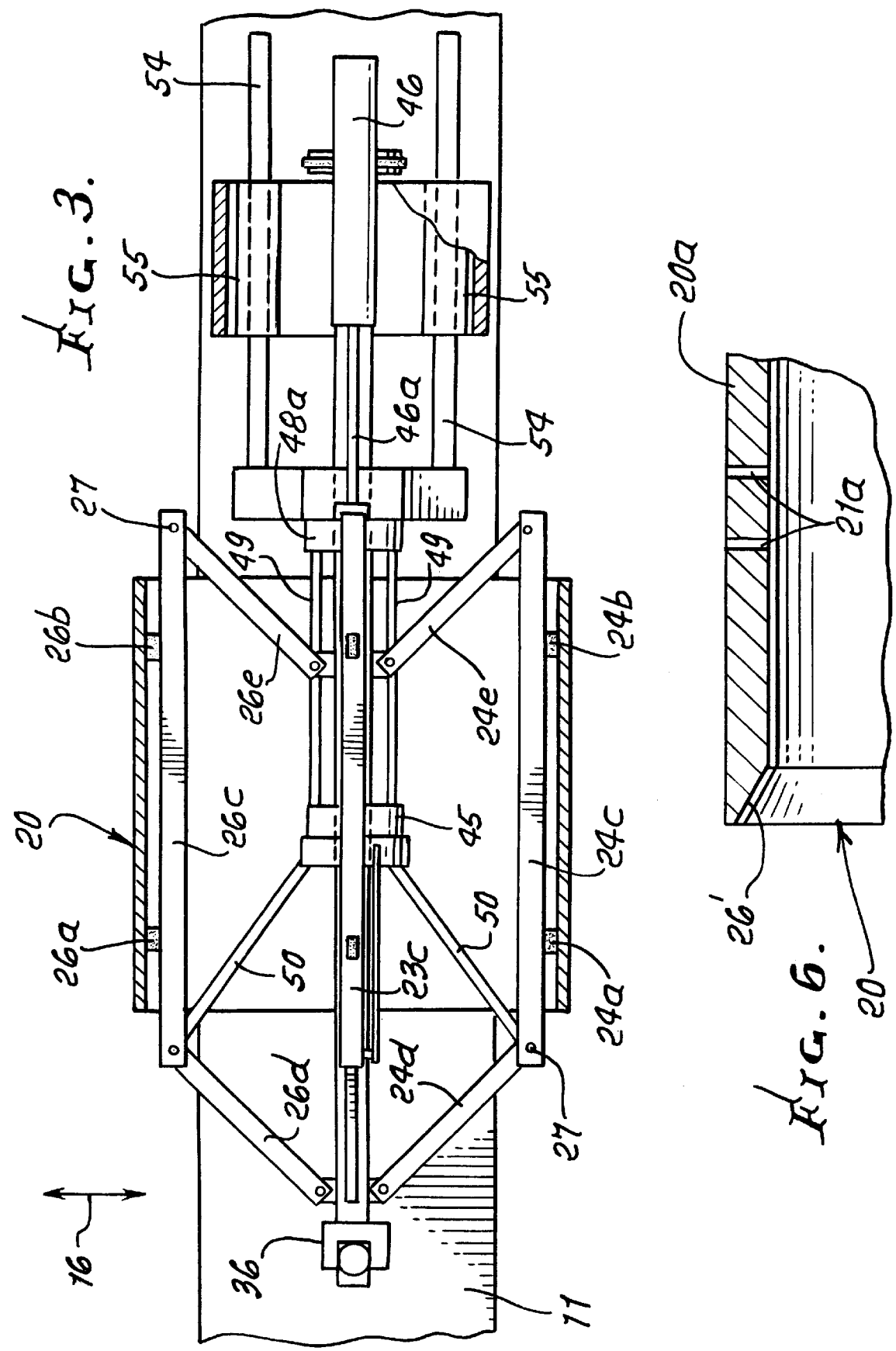

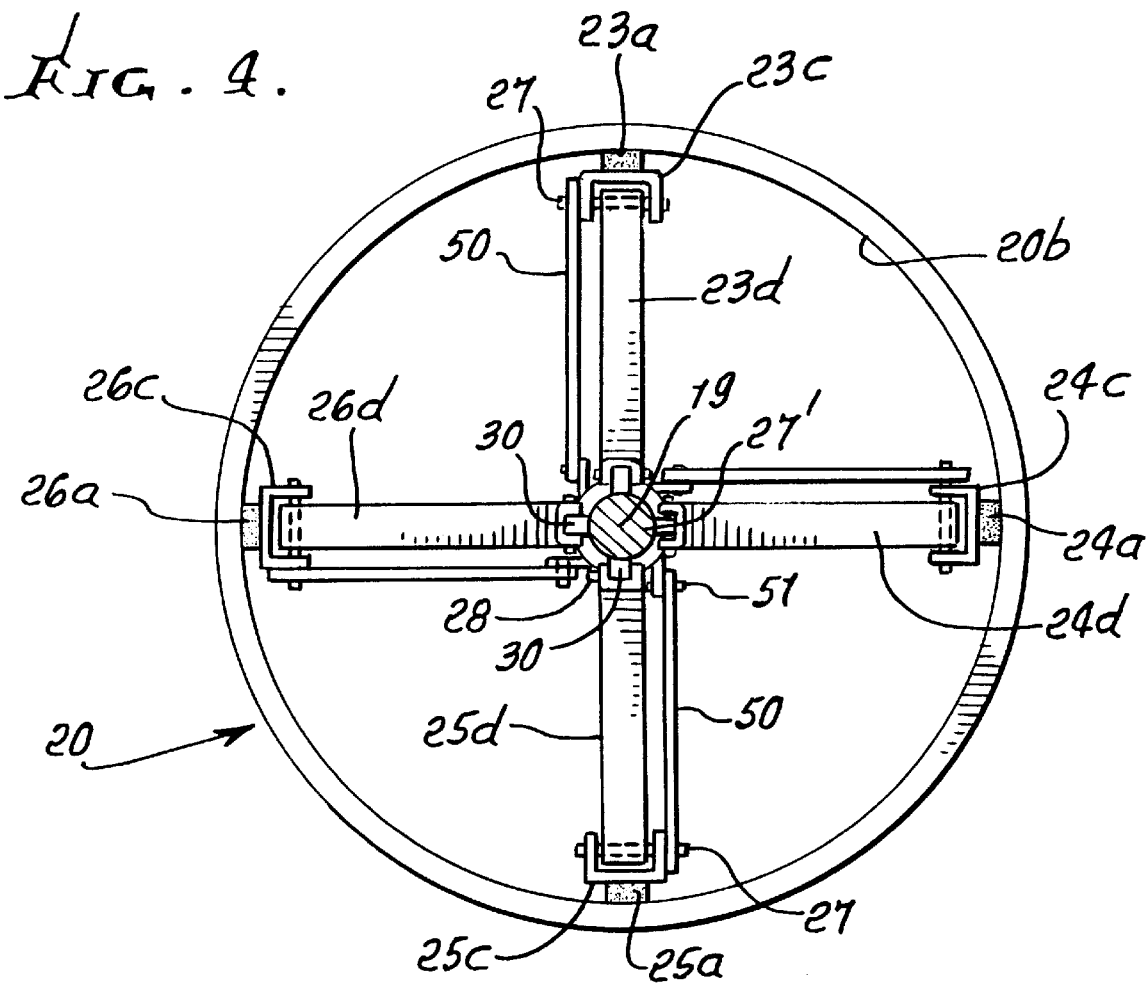
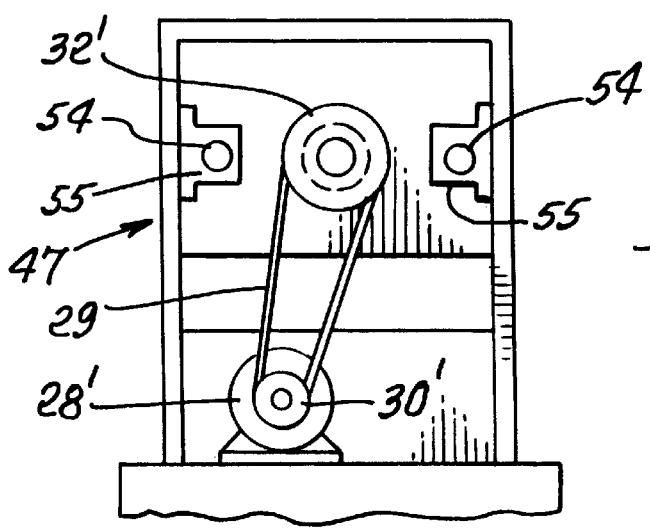

DRUM PROCESSING APPARATUS

BACKGROUND OF THE INVENTION

This invention relates generally to manufacture of drums, and more particularly to processing of drum shells, as are made of wood and/or plastic material.

There is need for improvements in method and means to process cylindrical drum shells, as during drum manufacture. Specifically, there is need to lower the cost and increase the speed the processing of drum shells of different sizes, as for example in size ranges between Tom Toms and bass drums. Also, there is need for improvements in apparatus that is accurate and reliable, and which is capable of speeding drum shell processing. Such processing may typically include drilling holes in the shells of different sizes, and at specified locations, and also accurately routing material from said shells.

SUMMARY OF THE INVENTION

It is a major object of the invention to provide improved apparatus and methods meeting the above needs. Basically, the improved apparatus comprises:

a) a cradle sized for reception in embracing relation with the shell, the shell having a longitudinal axis, the cradle having support means to clamp a cylindrical surface of the shell and at lengthwise locations, for supporting the shell, b) means operatively coupled to the cradle to effect displacement of the support means to clamp the shell surface, c) means for rotating the cradle about an axis corresponding to the drum shell axis, thereby to rotate the shell about the axis, d) and tooling facing the shell to engage and process the shell as it rotates.

As will appear, the cradle may typically include lengthwise elongated frame members extending within the shell and spaced about the axis, the members carrying the support means which comprise clamping pads. Accordingly, drum shells of different diameters and lengths can easily be supported by the cradle.

It is another object to provide an improved cradle construction, and which includes axially movable parts, the cradle including angled frame elements extending between at least one of the parts and the frame members to urge the frame members outwardly as the parts are relatively displaced, axially. As will be seen, there may typically be multiple pairs of angled support members that extend in parallel relation, each pair pivotally coupled to one of the longitudinally elongated frame members. Also, the means coupled to the cradle to effect displacement of the engagement means may include actuator means coupled to at least one of the parts to relatively axially displace the parts, thereby to cause the cradle to grip the drum shell. In addition, the means to rotate the cradle typically includes a rotary drive coupled to the telescopically interfitting parts.

It is a further object to provide a bed that supports the cradle, the means to effect displacement of the cradle engagement means, and the cradle rotating means, the bed movable axially and relative to processing means engageable with the drum shell. Accordingly, shells of different lengths can be easily and rapidly processed, and routing of the shells, to different axial lengths, can easily be accomplished.

As will further be seen, the shell processing means typically faces the exterior surface of the shell, and may include a router to form an annular step on the shell at a preselected location, and a drill or drills to form openings in the shell, as for example to receive drum lugs.

These and other objects and advantages of the invention, as well as the details of an illustrative embodiment, will be more fully understood from the following specification and drawings, in which:

DRAWING DESCRIPTION

FIG. 2 is an enlarged fragmentary side view showing cradle construction and actuation;

FIG. 3 is a plan view on lines 3—3 of FIG. 2 showing a cradle operated to engage the interior surface of a shell;

FIG. 4 is an enlarged end view taken on lines 4—4 of FIG. 2;

FIG. 5 is an elevation taken on lines 5—5 of FIG. 2;

FIG. 6 is a fragmentary view of a shell end portion that has been handled by a router;

DETAILED DESCRIPTION

Figure 1:
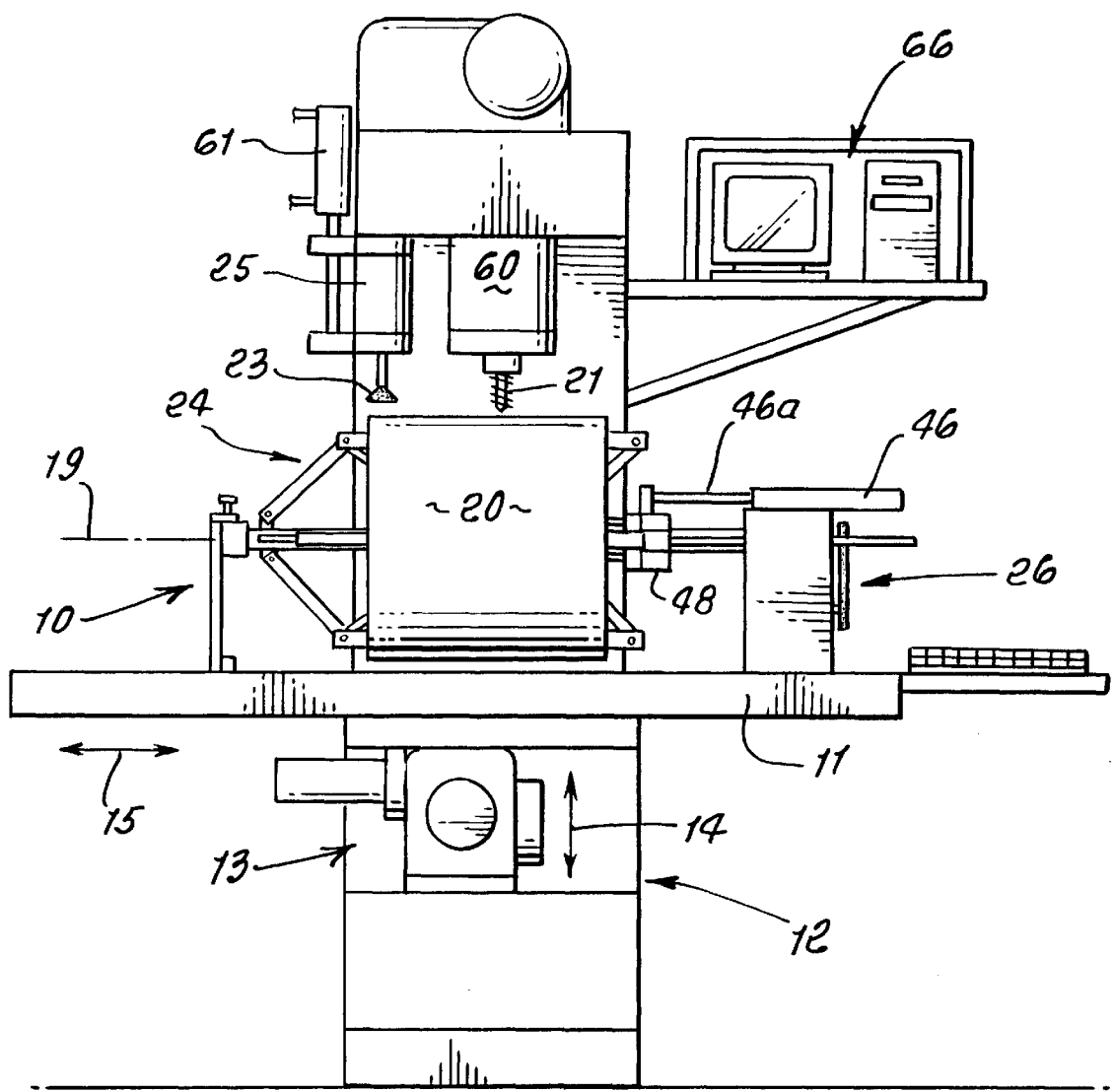
FIG. 1 is a frontal elevation of apparatus incorporating the invention.

In the drawings, a frame 10 includes a horizontal bed 11. Means supporting the bed for travel is indicated generally at 12; and a drive or drives 13 is operatively connected with the bed to controllably displace the bed vertically (see arrows 14), horizontally longitudinally (see arrows 15), and horizontally laterally (see arrows 16).

A cylindrical drum shell 20 is supported above the bed for rotation above a longitudinally horizontal axis 19. The shell may consist, for example, of wood and/or plastic material; and it may be of different radial and length dimensions, depending upon its intended use. See for example the drum disclosed in my U.S. patent application Ser. No. 08/567,969 filed Dec. 6, 1995, incorporated herein by reference.

Figure 7:
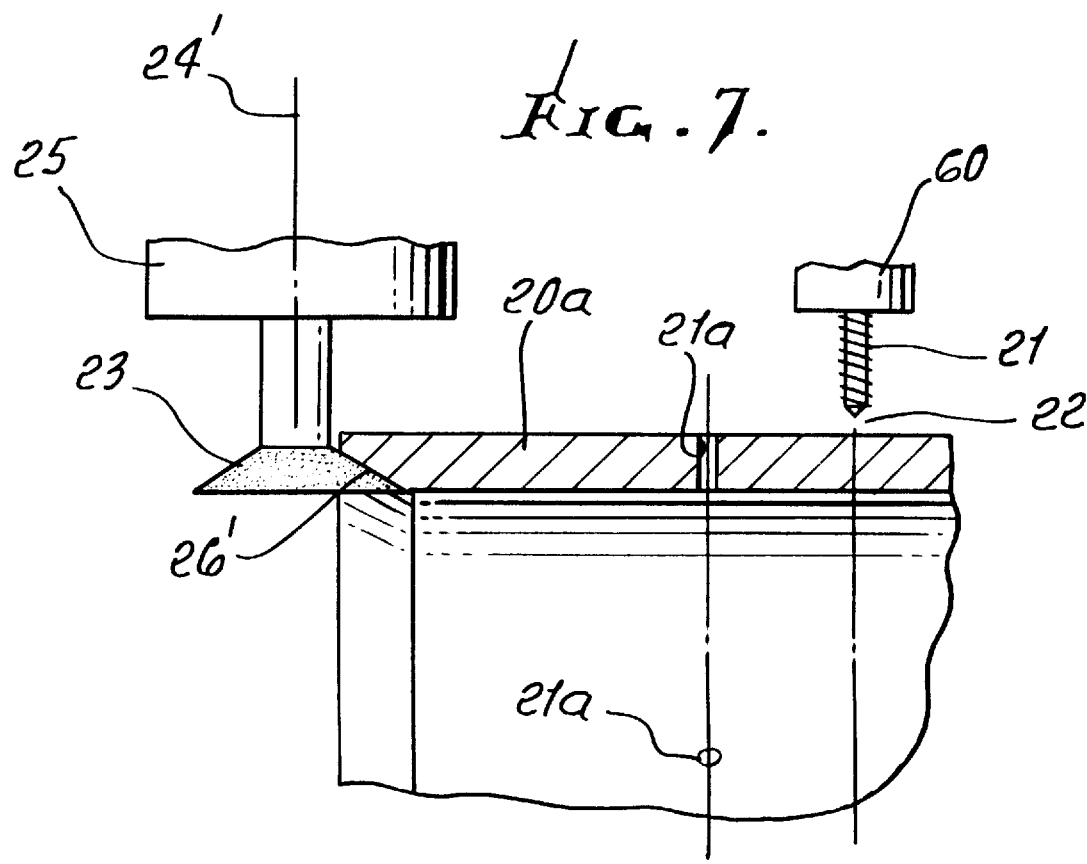
FIG. 7 is a view like FIG. 6 but showing operation of a router and a drill.

FIG. 7 shows a portion 20a of a supported drum shell, in relation to a drill 21 operable to drill holes at different locations in the shell, as indicated at 22, the holes extending radially. A router is also shown at 23, to be rotated about radially extending axis 24, as by motor 25. An annular bevel 26 or other shape groove, may be formed by the router, as the drum is rotated about its longitudinally horizontal axis 21. Drilled holes in the shell appear at 21a. See also FIG. 6. A drill motor is seen at 60. Structure 61 moves 25 and/or 60 toward and away from the drum.

The drum is shown as supported by a cradle 24 sized for reception in embracing relation to the shell, as for example into the shell interior to controllably engage the drum inner cylinder surface 20b. For this purpose, the cradle has support means to controllably clamp the shell inner surface 20b at lengthwise locations, which typically are longitudinally spaced, as well as spaced about the shell longitudinal axis 19. See for example pairs of support pads 23a and 23b, 24a and 24b, 25a and 25b, and 26a and 26b. Longitudinally extending beam members 23c, 24c, 25c, and 26c carry the respective pairs of pads and are located at 90° intervals about the axis 19, i.e., at 0°, 90°, 180°, and 270°.

The beam members are adjustably movable radially inwardly so as to allow the drum shell to be mounted on the cradle, and outwardly, to effect clamping of the pads against the shell inner wall. During such movement, pads 23*a*, 24*a*, 25*a*, and 26*a* remain in a first common plane (see the plane of FIG. 4) perpendicular to axis 19; and pads 23*b*, 24*b*, 25*b*, and 26*b* remain in a second common plane perpendicular to axis 19. Also, during such movement, all pads remain at the same radial distance from axis 19, maintaining drum concentricity about axis 19, which is the axis of drum rotation effected by a drive seen at 26. It includes a drive shaft 27 extending longitudinally axially, a motor 28, a drive belt 29, a sheave 30 on the motor shaft 31, and a sheave 32 on the main shaft 27.

The cradle beam or frame members 23*c*, 24*c*, 25*c*, and 26*c* remain parallel and are advantageously supported by pairs of parallelogram linkage arms. The latter includes arms 23*d* and 23*e* supporting beam member 23*a*; arms 24*d* and 24*e* supporting beam member 24*c*; 25*d* and 25*e* supporting beam member 25*c*; and arms 26*d* and 26*e* supporting beam member 26*c*. The arms of each pair have the same length and remain parallel during beam member radial movement, whereby the beam members remain parallel. Pivot connections of the arms to the beam members are shown at 27. Arms 23*d*–26*d* have pivot connections at 28 to lugs 30, and arms 23*e*–26*e* have pivot connections at 31 to lugs 32. The lugs are connected to the main shaft (see FIG. 4) to be driven in rotation, to rotate the arms and beam members, as the main shaft is rotated. Bearing supports for the main shaft are shown at 36 and 37, and carried by the bed.

Means is operatively coupled to the cradle to effect displacement of the drum shell support means for causing its clamping engagement with the shell interior surface, as referred to. In the example shown (there being other usable examples which may operate in other ways), the displacement means includes axially movable parts, such as a collar 45 driven axially on and relative to the shaft 27, as by an air cylinder actuator 46 carried at 47 by the bed. Coupling between 45 and 46 includes a slider 48 on the shaft 27, actuator piston rod 46*a* connected to the slider to move it longitudinally axially, and connector rods 49 connecting 48 and 45. See also guide rods 54 slidable in bearings 55. Part 48*a* of the slider rotates with rods 49 and the cradle.

Angled frame members 50 on the cradle connect the collar 45 to the beam or frame members, and have pivot connections 51 to the collar, and pivot connections at 27 to the frame members.

A computer control 66 controls all the drives.

Figure 8:
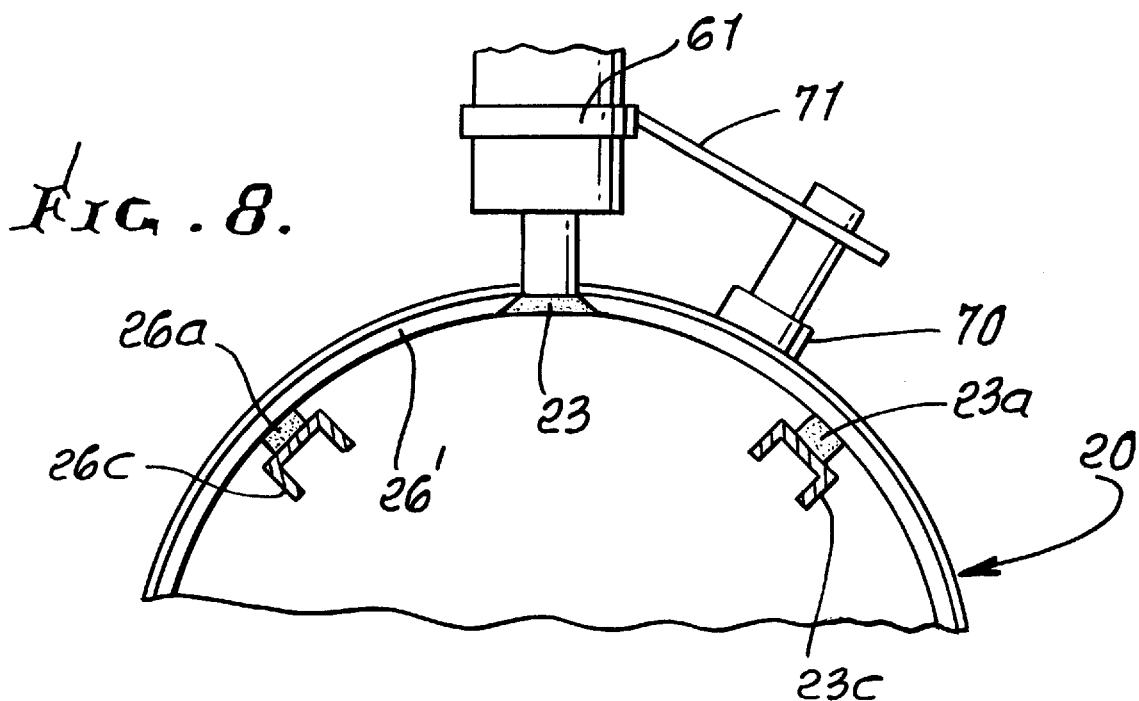
FIG. 8 is an end view showing means to control a router position in accordance with sensed irregularity in drum shell concentricity.

FIG. 8 shows a sensing means 70 to sense irregularities on the drum surface, such as non-concentricity of the drum surface, as it rotates. A feedback at 71 from the sensor 70 to the radial drive for the router, or for the motor, causes the radial drive to displace the router or motor to compensate for such sensed irregularities.

I claim:

1. An apparatus for processing the cylindrical shells of drums, the combination comprising
    a) a cradle sized for reception in embracing relation with the shell, the shell having a longitudinal axis, the cradle having support means to clamp a cylindrical surface of the shell and at lengthwise locations, for supporting the shell,
    b) displacement means operatively coupled to the cradle to effect displacement of said support means to clamp said shell surface,
    c) rotating means for rotating the cradle about an axis corresponding to the drum shell axis, thereby to rotate the shell about said axis,
    d) whereby tooling facing the shell may engage and process the shell as it rotates,
    e) said cradle including lengthwise elongated frame members extending within the shell and spaced about said axis, said members carrying said support means,
    f) said displacement means including axially relatively movable parts, and the cradle includes angled frame elements extending between at least one of said parts and said frame members to urge said frame members outwardly as said parts are relatively displaced, axially.

2. The combination of claim 1 including a bed supporting said cradle, and said means for rotating the cradle, said bed movable axially, and relative to processing means engageable with the drum shell.

3. The combination of claim 2 including said processing means which faces the exterior surface of the drum shell.

4. The combination of claim 3 wherein said processing means includes at least one of the following:
    i) a router to form an annular step on the shell
    ii) a drill to drill openings in the shell.

5. The combination of claim 1 including means to sense irregularity at the drum surface as the drum rotates, and to adjust the radial position of the tooling in accordance with said sensing.

6. An apparatus for processing the cylindrical shells of drums, the combination comprising
    a) a cradle sized for reception in embracing relation with the shell, the shell having a longitudinal axis, the cradle having support means to clamp a cylindrical surface of the shell and at lengthwise locations, for supporting the shell,
    b) means operatively coupled to the cradle to effect displacement of said support means to clamp said shell surface,
    c) means for rotating the cradle about an axis corresponding to the drum shell axis, thereby to rotate the shell about said axis,
    d) and tooling facing the shell to engage and process the shell as it rotates,
    e) said cradle including lengthwise elongated frame members extending within the shell and spaced about said axis, said members carrying said support means which comprise clamping pads,
    f) and wherein said displacement means includes axially movable parts, and the cradle includes angled frame elements extending between at least one of said parts and said frame members to urge said frame members outwardly as said parts are relatively displaced, axially.

7. The combination of claim 6 wherein the cradle includes multiple pairs of angled support members that extend in parallel relation, each pair pivotally coupled to one of said longitudinally elongated frame members.

8. The combination of claim 6 wherein said means coupled to the cradle to effect displacement of said engagement means includes actuator means coupled to at least one of said parts to relatively axially displace said parts, thereby to cause said cradle to grip the drum shell.

9. The combination of claim 6 wherein said means rotate the cradle including a rotary drive coupled to said parts.

* * * * *